(12) United States Patent
Zhu et al.

(10) Patent No.: US 8,744,437 B2
(45) Date of Patent: Jun. 3, 2014

(54) METHOD FOR REALIZING USER ACCESSIBILITY AND MULTI-MODE TERMINAL

(75) Inventors: Jinguo Zhu, Shenzhen (CN); Shuang Liang, Shenzhen (CN); Ying Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 13 days.

(21) Appl. No.: 13/257,933

(22) PCT Filed: Nov. 9, 2009

(86) PCT No.: PCT/CN2009/074862
§ 371 (c)(1),
(2), (4) Date: Feb. 10, 2012

(87) PCT Pub. No.: WO2011/022896
PCT Pub. Date: Mar. 3, 2011

(65) Prior Publication Data
US 2012/0157093 A1  Jun. 21, 2012

(30) Foreign Application Priority Data
Aug. 25, 2009 (CN) .......................... 2009 1 0168865

(51) Int. Cl.
*H04W 4/00* (2009.01)
(52) U.S. Cl.
USPC ........ 455/433; 455/432.1; 455/436; 455/448; 455/456.1; 455/466; 370/328; 370/338

(58) Field of Classification Search
CPC ..... H04W 48/18; H04W 60/00; H04W 68/02; H04W 76/02; H04W 76/045; H04W 28/04; H04W 36/12; H04W 48/16; H04W 36/002; H04W 24/02; H04W 24/04; H04W 28/02; H04W 60/06
USPC ......... 370/328–338; 455/404.2, 432.1–435.3, 455/436–444, 448, 456.1–457, 466
See application file for complete search history.

(56) References Cited

U.S. PATENT DOCUMENTS

2001/0053684 A1* 12/2001 Pirila ............................ 455/410
2005/0119008 A1*  6/2005 Haumont .................. 455/456.1
(Continued)

FOREIGN PATENT DOCUMENTS

CN     101052212 A    10/2007
CN     101409901 A     4/2009
(Continued)

OTHER PUBLICATIONS

3GPP TS 23.012 V8.2.0 (Sep. 2009) Technical Specification by 3rd Generation Partnership Project—Release 8.*
(Continued)

Primary Examiner — Quan M Hua
(74) Attorney, Agent, or Firm — Oppedahl Patent Law Firm LLC (57) ABSTRACT

The disclosure discloses a method for realizing user accessibility and a multi-mode terminal. A UE initiates, after a tracking area update (TAU) periodic timer of the UE expires, an update process to a mobile switching center/visitor location register (MSC/VLR) in the case that an idle mode signaling reduction (ISR) is activated and the UE resides in a global system for mobile communications/universal mobile telecommunication system (GSM/UMTS). The disclosure improves user experience.

14 Claims, 4 Drawing Sheets

(56) References Cited

U.S. PATENT DOCUMENTS

| | | |
|---|---|---|
| 2005/0265279 A1* | 12/2005 | Markovic et al. ............. 370/328 |
| 2009/0036143 A1 | 2/2009 | Martin et al. |
| 2009/0103455 A1* | 4/2009 | Balasubramanian et al. 370/254 |
| 2010/0098023 A1* | 4/2010 | Aghili et al. .................. 370/331 |
| 2010/0124223 A1* | 5/2010 | Gibbs et al. ................... 370/389 |
| 2011/0105153 A1* | 5/2011 | Miklos et al. .............. 455/456.5 |
| 2012/0106324 A1* | 5/2012 | Keller et al. .................. 370/225 |

FOREIGN PATENT DOCUMENTS

| | | |
|---|---|---|
| CN | 101472301 A | 7/2009 |
| CN | 101472310 A | 7/2009 |
| WO | 2007088338 A2 | 8/2007 |

OTHER PUBLICATIONS

3GPP TS 23.401 V8.2.0 (Dec. 2008) Technical Specification by 3rd Generation Partnership Project—Release 8.*

International Search Report in international application No. PCT/CN2009/074862, mailed on May 27, 2010.

English Translation of the Written Opinion of the International Search Authority in international application No. PCT/CN2009/074862, mailed on May 27, 2010.

Discussion on the ISR Function Nov. 9, 2007.

TR24.801—A new scenario for TAU procedure from ISR Feb. 1, 2008.

Idle Mode Signalling Reduction for TS 23.402 Nov. 16, 2007.

3GPP TS 23.401 V8.6.0; General Packet Radio Service (GPRS) enhancements for Evolved Universal Terrestrial Radio Access Network (E-UTRAN) access; p. 15 and pp. 20-23; Jun. 10, 2009.

* cited by examiner

METHOD FOR REALIZING USER ACCESSIBILITY AND MULTI-MODE TERMINAL

TECHNICAL FIELD

The disclosure relates to the filed of mobile communication, in particular to a method for realizing user accessibility and a multi-mode terminal.

BACKGROUND

The standard team of the third generation partnership project (3GPP) is currently focused on studying the evolution of Packet Switched Core (PS Core) and Universal Mobile Telecommunication System Radio Access Network (UTRAN), in order to enable the Evolved Packet Switched Core (EPC) to provide high transmission rate and low transmission delay, and support the Evolved UTRAN (E-UTRAN), UTRAN and GSM EDGE Radio Access Network (GERAN), as well as accessing and mobility management of many radio technologies, such as Global System for Mobile communications (GSM) and Enhanced Data Rate for GSM Evolution (EDGE) and the like. This evolved mobile communication system is called Evolved Packet System (EPS).

Figure 1:
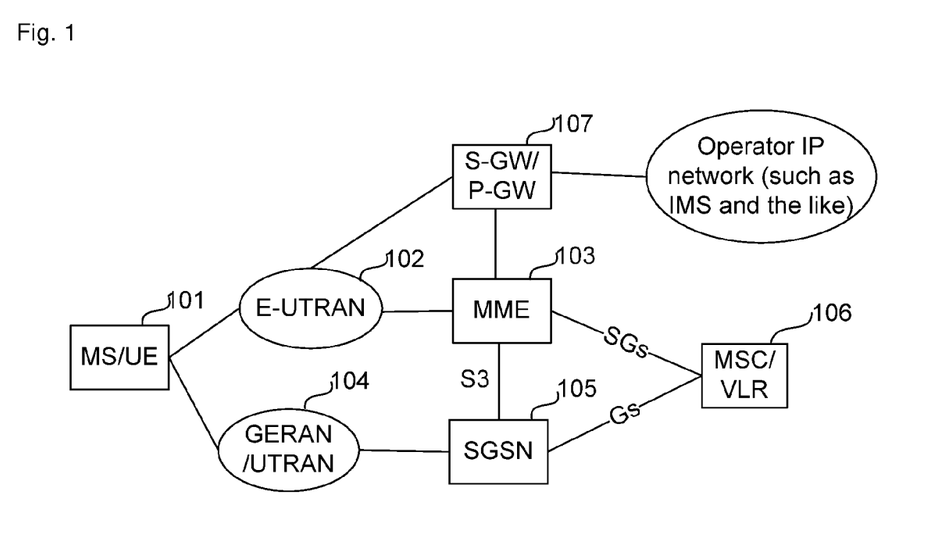
FIG. 1 shows a diagram of network architecture in the GSM/universal mobile telecommunications system (UMTS) and EPS network related to the disclosure in the prior art.

FIG. 1 shows a diagram of network architecture in the GSM/Universal Mobile Telecommunications System (UMTS) and EPS network related to the disclosure in the prior art, as shown in FIG. 1, comprising:

a mobile station 101, which is called Mobile Station (MS) or User Equipment (UE). A terminal with a capacity of accessing two kinds of radio networks is called a dual-mode terminal, while a terminal with a capacity of accessing multiple kinds of radio networks is called multi-mode terminal. Therefore, MS/UE is a dual-mode or multi-mode terminal that can access GSM/UMTS network and EPS network, which is uniformly represented by UE or terminal below.

E-UTRAN 102: the radio access network of the evolved EPS network may provide a high uplink/downlink rate, low transmission delay, and reliable radio transmission. A network element included in the E-UTRAN is an Evolved NodeB (eNodeB) that provides radio resources for the access of the terminal.

Mobility Management entity (MME) 103 is a control plane entity as well as a server for temporarily saving user data, which is responsible for managing and saving a UE context, such as UE/subscriber identity, mobility management state, user security parameters, for distributing a temporary identity for a subscriber, and for authenticating the subscriber when the UE resides in the tracking area or the network. MME is mainly responsible for access control, mobility management and other tasks when the UE accessing from E-UTRAN.

GERAN/UTRAN 104: a radio access network of traditional GSM/UMTS.

GSM/UMTS network is divided into Circuit Switching (CS) domain and Packet Switching (PS) domain.

General Packet Radio Service (GPRS) Serving GPRS Support Node (SGSN) 105: GPRS SGSN is a control network element in PS domain of the GSM/UMTS network with a main function of recording the location information of the UE and performing transmission and reception of mobile packet data between the UE and the Gateway GPRS Supporting Node (GGSN). SGSN is mainly responsible for access control, is mobility management and other tasks when the UE is accessing from PS domain of the GSM/UMTS network.

Mobile Switching Center (MSC)/Visitor Location Register (VLR) 106: the MSC/VLR may also be a new function entity MSC Server after 3GPP Release (R) 4 stage, which is uniformly represented by MSC/VLR in the disclosure. The MSC/VLR is the network element of core network in CS domain of the GSM/UMTS network, responsible for control of subscriber accessing, mobility, voice and SMS service in circuit domain.

Serving Gateway (S-GW) and Packet Data Network Gateway (P-GW) 107: S-GW is a user plane entity, which is responsible for user plane data routing processing; P-GW is responsible for gateway function on accessing to Packet Data Network (PDN) by user. P-GW and S-GW may be arranged jointly in a physical entity or separately in different physical entities.

Operator Internet Protocol (IP) network means a network in which an operator provides services. An example of IP network is an IP Multimedia Core Network Subsystem (IMS), which is just a kind of operator IP network. IMS is a Session Initiation Protocol (SIP)-based network architecture proposed by 3GPP which constructs an open and flexible service environment, supports multimedia applications, and provides rich multimedia services to users.

In a 3GPP mobile communication system, when a terminal is in idle state, the terminal and a network element of core network run a timer respectively in order to guarantee the network to page the terminal and waste no network resource in the case that the terminal is inaccessible, wherein the timer in the terminal is called periodic update timer, and the timer in the network element of core network is called implicit detach timer. When the periodic update timer of the terminal expires, a periodic update will be initiated, and then the terminal and the network element of core network restart their own timers. Generally, the implicit detach timer of the network element of core network has longer time than that of the periodic update timer of the terminal. Thus, if the implicit detach timer of the network element of core network expires while no update message is received from the terminal, it would be known that the user is out of coverage is area at present, and the terminal is inaccessible, then it will waste air interface resources for paging this terminal later. At this point, the network element of core network sets the user in the implicit detach state. This mechanism is to ensure that the user is accessible.

The terminal respectively has independent periodic update timers for the circuit domain of the GSM/UMTS network, the packet domain of the GSM/UMTS network and the EPS network: periodic Location Area Update (LAU) timer for the circuit domain of the GSM/UMTS network, periodic Routing Area Update (RAU) timer for the packet domain of the GSM/UMTS network, and periodic Tracking Area Update (TAU) timer for the EPS network. The network elements of core network MSC/VLR, SGSN and MME also respectively run three implicit detach timers.

In a GSM/UMTS network, the UE may perform CS and PS attach/update respectively. When performing CS and PS attach/update respectively, the UE sends LAU and RAU request message to the GERAN/UTRAN respectively. The MSC/VLR receives the LAU request message through the GERAN/UTRAN and performs the update/attach process of the CS domain. SGSN receives the RAU request message through the GERAN/UTRAN and performs the update/attach process of the PS domain. As the respective mode in which the CS domain and the PS domain perform attach/update needs to respectively occupy radio resources and perform signaling exchange, Therefore a Gs interface is introduced between the MSC/VLR and the SGSN.

When the Gs interface is introduced, in consideration of compatibility and flexibility of network deployment, network modes I, II and III are introduced. When the network works in mode I, the UE performs update through combined RAU/LAU process. A Gs association exists between the MSC/VLR and the SGSN. When the network works in mode II/III, the UE performs RAU and LAU processes respectively.

In order to perform CS services such as call and SMS and the like when the UE is accessed from E-UTRAN, an SGs interface is also introduced between the MME and the MSC/VLR.

At the same moment, the user has only one Gs association or one SGs association is in the MSC/VLR.

Gs association is established through the combined attach or combined routing area/location area update, while the SGs association is established through the combined attach or combined tracking area/location area update. In the combined attach or combined routing area/location area update, or in the combined attach or combined tracking area/location area update, the UE performs attach or update in the SGSN/MME firstly, then the SGSN/MME initiates CS attachment or update to the MSC/VLR according to the type of attach/update, and establishes the Gs/SGs association to the MSC/VLR. The flow is shown in FIG. 2.

Figure 2:
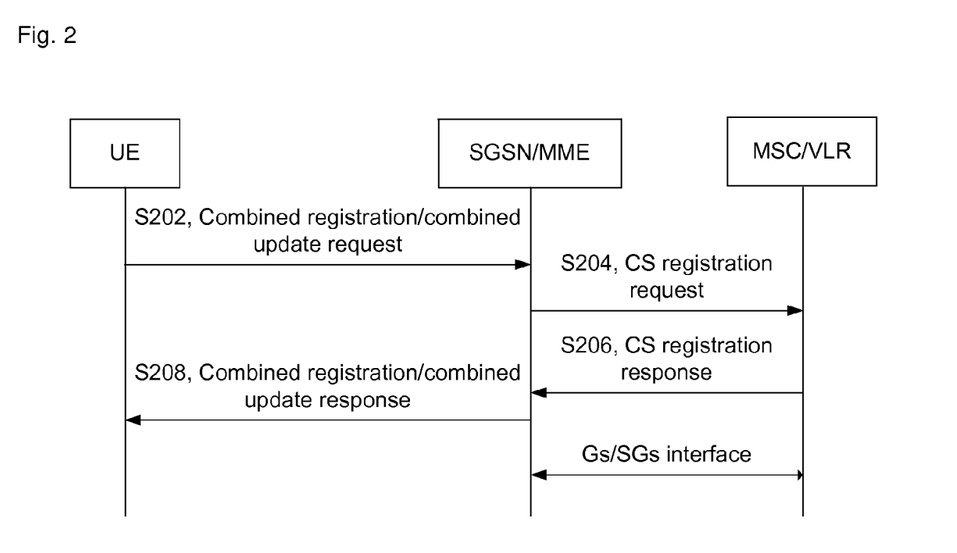
FIG. 2 shows an interaction flow chart of establishing Gs/SGs interfaces according to the prior art.

FIG. 2 shows an interaction flow chart of establishing Gs/SGs interfaces according to the prior art. As shown in FIG. 2, it comprises steps from S202 to S208 as follows:

S202: UE sends a combined register/combined update request message to the SGSN/MME.

S204: The SGSN/MME sends a CS register request message to MSC/VLR.

S206: The MSC/VLR sends a CS register response message to the SGSN/MME.

S208: The SGSN/MME sends a combined register/combined update response message to the UE, the SGSN/MME and the MSC/VLR establishes Gs/SGs interface.

Afterwards, after the UE moves, the UE will initiate a routing area update or tracking area update to notify the current location information to the SGSN/MME. If the Location Area Identity (LAI) of the user also changes, then the UE initiates a combined routing area/location area update or combined tracking area/location area update, and the SGSN/MME further updates the MSC to ensure that the LAI of the user in the MSC is accurate. After the Gs/SGs association is established, the periodic LAU timers of the CS in the MSC/VLR and the terminal are deactivated, and the accessibility of the terminal user is guaranteed by the packet domain periodic RAU/TAU timer. Therefore, the terminal needs not to perform periodic location area update.

At the early stage of E-UTRAN deployment, an area covered by both GERAN/UTRAN and E-UTRAN exists. When the user resides in the area covered by both GERAN/UTRAN and E-UTRAN, in order to reduce excessive air-interface signaling caused by repeatedly selecting a network between GERAN/UTRAN and E-UTRAN and is initiating a registration by the user, 3GPP defines Idle mode Signaling Reduction (ISR). In ISR, the main idea is that when the UE registers with both SGSN and MME, both SGSN and MME save user context information, and the UE also saves the, registration information of the two networks, such that no TAU and RAU process needs to be performed when the UE subsequently selects between the two networks unless the current routing area or the current tracking area list of the UE is not registered. In the case of ISR, as the user does not initiate an update when changes the access system, therefore the core network does not know which access system the UE resides when the user is in idle state. At this point, it needs page in both SGSN and MME when paging a user. When ISR is activated, MME and SGSN save address information for each other, such that, the MME or SGSN may find each other and initiate paging when the MSC/VLR pages the user.

Figure 3:
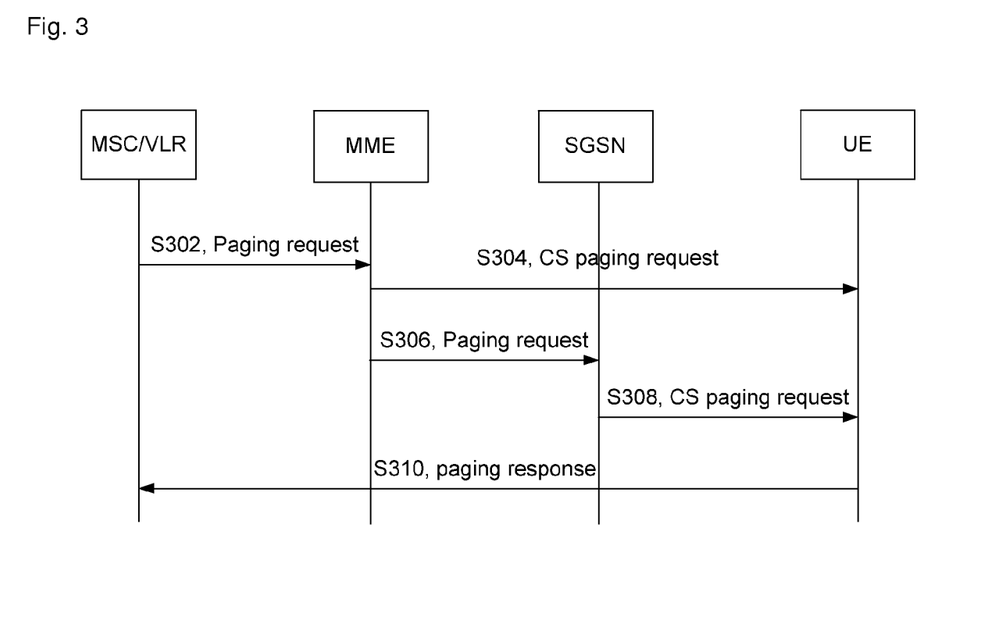
FIG. 3 shows an interaction flow chart comprising SGs activation and MME receiving paging from the MSC/VLR according to the prior art.

FIG. 3 shows an interaction flow chart comprising SGs activation and MME receiving paging from the MSC/VLR according to the prior art. As shown in FIG. 3, the interaction flow chart comprising ISR activation, SGs activation between MSC/VLR and MME, and MME receiving paging from the MSC/VLR comprises steps from S302 to S310 as follows:

S302: The MSC/VLR initiates paging to the MME through the SGs interface.

S304: The MME, according to the location information of the user and through eNodeB where the UE is located, initiates CS paging to the UE.

S306: As ISR has been activated and the UE user is in idle state, the MME forwards the paging message from the MSC/VLR to the SGSN according to the location information of the SGSN saved in the MME.

S308: The SGSN, according to the location information of the terminal user thereof and the location information in the paging message, through the GERAN/UTRAN where the UE is located, initiates CS paging to the UE.

S310: The UE performs fallback or cell reselection and the like according to the prior art to return a paging response from the CS domain of GSM/UMTS network.

For ISR-activated UE, when the UE is in idle state, it is necessary to maintain the periodic TAU and periodic RAU timers respectively. When the periodic TAU timer of the UE expires, if the UE currently resides in the Long-Term Evolution (LTE), the UE will initiate a periodic TAU; if the UE does not reside in the LTE currently, the UE will not be triggered to initiate the periodic TAU. At this point, the UE needs to remember to further initiate a periodic TAU when returning to the area covered by LTE. The processing on expiration of the periodic RAU timer of the UE is similar to that on the expiration of the periodic TAU timer.

Based on above background, the following scene is considered. UE registers in the GSM/UMTS network firstly, then registers in the EPS network; after completion of the above registrations, an SGs interface is established and activated between the MME and the MSC/VLR; further, an ISR association is established between the MME and the SGSN; the UE registers in the SGSN, MME and MSC/VLR saves the registration information in these networks, and identifies that ISR has been activated. When the UE moves into the GSM/UMTS network and the current routing area has been registered, as ISR has been activated, the UE will not initiate a RAU process; the current routing area of the UE is identified through Routing Area Identity (RAI). At this point, the SGs interface between the MME and the MSC/VLR still exists, and the implicit detach timer in the MME still runs. After the E-UTRAN periodic TAU timer in the terminal expires, as the UE resides in the GSM/UMTS network, the UE will not initiate a periodic TAU to the MME. In this way, after a period of time, the MME may implicitly detach the terminal as the implicit detach timer expires and send a detach indication message to the MSC/VLR to deactivate the SGs interface. If MSC/VLR receives the detach indication message and believes that the user is still accessible and thereby initiates an implicit detach timer therein, then if the GSM/UMTS network works in the network mode I, the SGSN will not send an update to the MSC/VLR as it is impossible to activate the Gs interface between the MSC/VLR and the SGSN, and the periodic RAU process initiated by the UE is not a combined update; if the GSM/UMTS network works in the network mode II or III, the UE cannot know that a periodic LAU is needed to be initiated as the periodic LAU timer has been closed. Subsequently, when the implicit detach timer in the MSC/VLR expires, the MSC/VLR will think that the user is inaccessible and then identify the terminal as implicit detach. If the MSC/VLR thinks that the user is inaccessible when receives the is detach indication message from the MME, it will directly identify the terminal as implicit detach. No matter which of the above cases causes the MSC/VLR to identity the terminal as implicit detach, it will result in that the UE, although actually in an accessible network, cannot receive a call or SMS and the like as a called user.

Till now, the prior art has not proposed a solution to the above problem so as to ensure user accessibility.

SUMMARY

The disclosure is proposed to address the problem of incapability of ensuring user accessibility in the prior art. Therefore, a main objective of the disclosure is to provide a solution for realizing user accessibility, so as to solve the problem of incapability of ensuring user accessibility in the prior art.

In order to realize the above objective, according to one aspect of the disclosure, a method for realizing user accessibility is provided.

The method for realizing user accessibility according to the disclosure comprises: initiating, by a UE, an update process to a MSC/VLR after a TAU periodic timer of the UE expires in the case that ISR is activated and the UE resides in the GSM/UMTS.

Preferably, the initiating, by a UE, an update process to a MSC/VLR comprises: the UE initiates a combined routing area/location area update to reactivate a Gs interface if the GSM/UMTS network where the UE resides supports network operating mode I.

Preferably, the UE initiates combined routing area/location area update, comprises: the UE initiates location update to the MSC/VLR through an SGSN to establish a Gs association.

Preferably, the UE initiates update to the MSC/VLR comprises: the UE initiates periodic LAU to the MSC/VLR if the GSM/UMTS network where the UE resides works in the case of supporting network operating mode II/III.

Preferably, after the UE initiates LAU to the MSC/VLR, the method further comprises: restarting a LAU periodic timer by the UE.

Preferably, the UE sets the time length of the periodic LAU timer according to one of the following ways: setting according to the time length of the periodic LAU update timer broadcasted by the radio system in the GSM/UMTS network area to which the UE currently accessed; setting according to the time length of the current periodic TAU timer of the UE; setting according to the smaller one of the following two time lengths: the time length of the periodic LAU update timer broadcasted by the radio system in the GSM/UMTS network area to which the UE currently accessed, and the time length of the current periodic TAU timer of the UE.

Preferably, after the UE initiates LAU to the MSC/VLR, the method further comprises: restarting an implicit detach timer by the MSC/VLR.

Preferably, after the TAU periodic timer of the UE expires, the method further comprises: recording expiration information of the TAU periodic timer by the UE.

In order to realize the above objective, according to another aspect of the disclosure, a multi-mode terminal is provided.

The multi-mode terminal according to the disclosure comprises: a CS module in the GSM/UMTS, a PS module in the GSM/UMTS, and a LTE module, wherein the CS module, the PS module and the LTE module respectively have a periodic update timer. The multi-mode terminal further comprises: an initiating module, which is configured to initiate an update process to the MSC/VLR when the periodic update timer in the LTE module expires and the multi-mode terminal resides in the GSM/UMTS network.

Preferably, the initiating module comprises: a first initiating sub-module, which is configured to initiate a combined routing area/location area update when the GSM/UMTS where the multi-mode terminal resides works in the case of supporting network operating mode I, a second initiating sub-module, which is configured to initiate a LAU when the GSM/UMTS where the multi-mode terminal resides works in the case of supporting network operating mode II/III.

Preferably, the terminal further comprises: a starting module, which is configured to restart the periodic update timer in the CS module when the second initiating sub-module initiates a LAU.

Preferably, the terminal further comprises: a recording module, which is configured to record expiration information of the periodic update timer in the LTE module after the TAU periodic timer of the UE expires.

Through the disclosure, when the ISR has been activated and the UE resides in the GSM/UMTS, after the TAU periodic timer of the UE expires, the UE initiates an update process to the MSC/VLR, thereby solving the problem of incapability of guaranteeing user accessibility in the prior art, and further improving user experience.

BRIEF DESCRIPTION OF THE DRAWINGS

Herein, the drawings provided here are for further understanding of the disclosure and form a part of the application. The exemplary embodiments of the disclosure and their depictions are used to explain the disclosure and not intended to form improper limitation to the disclosure. In the drawings.

DETAILED DESCRIPTION

Function Overview

Considering the problem in the art that MSC/VLR believes that user is inaccessible because MSC/VLR later cannot receive a location update message when a SGs interface is activated, an ISR is activated, a terminal resides in a GSM/UMTS network, and an implicit timer in MME expires. The embodiments of the disclosure provide a solution for realizing user accessibility, wherein the UE initiates an update process to the MSC/VLR after the TAU periodic timer of the UE expires in the case that the ISR is activated and the UE resides in the GSM/UMTS, which guarantees user accessibility.

It should be noted that the embodiments in the application and the features in the embodiments could be combined together in case of no conflict. The disclosure will be described in detail below with reference to the drawings in conjunction with embodiments.

Method Embodiments

According to the embodiments of the disclosure, a method for realizing user accessibility is provided, comprising:

A UE initiates an update to the MSC/VLR after a TAU periodic timer of the UE expires in the case that ISR is activated and the UE resides in a GSM/UMTS.

The implementing process of the embodiments of the disclosure will be described in detail below in conjunction with cases.

Embodiment 1

Figure 4:
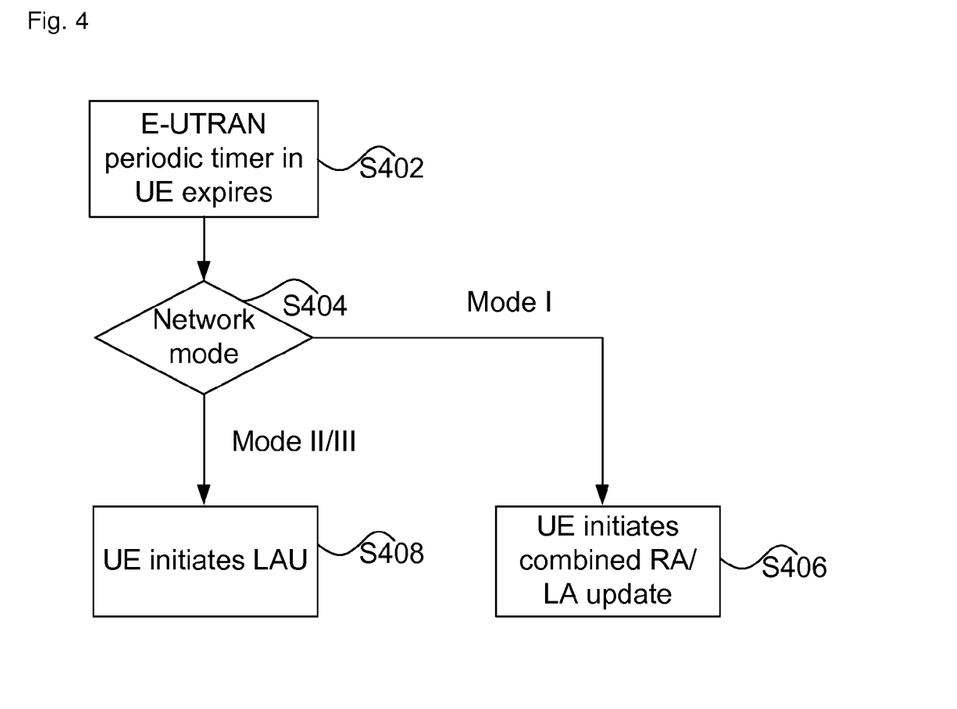
FIG. 4 shows a diagram of a method for guaranteeing user accessibility according to Embodiment 1 of the disclosure.

FIG. 4 shows the diagram of a method for guaranteeing UE accessibility according to Embodiment 1 of the disclosure, as shown in FIG. 4, comprising steps from S402 to S408 as below:

S402: The UE resides in the GSM/UMTS network currently, and a E-UTRAN periodic TAU timer in the UE expires.

S404: The UE determines the network mode in which it resides currently, wherein if the network mode in which it resides is mode I, executing S406; and if the network mode in which it resides is mode II/III, executing S408.

S406: If the network mode in which the UE resides is mode I, the UE initiates a combined routing area/location area update in the GSM/UMTS network to reactivate Gs interface. That is to say, the UE initiates a location update to the MSC/VLR through the SGSN to establish Gs association, then the MSC/VLR may still, dependent on the SGSN, check the user-accessibility.

S408: If the network mode in which the UE resides is mode II/III, the UE initiates a LAU request in the GSM/UMTS network; the MSC/VLR restarts an implicit detach timer after receiving the LAU request, the UE restarts a LAU periodic timer, so as to guarantee user accessibility.

Wherein, the UE sets the time length of the periodic LAU timer according to the following ways:

setting according to the time length of the periodic LAU update timer broadcasted by the radio system in the GSM/UMTS network area to which the UE currently accessed;

setting according to the time length of the current periodic TAU timer of the UE;

setting according to the smaller one of the following two time lengths: the time length of the periodic LAU update timer broadcasted by the radio system in the GSM/UMTS network area to which the UE currently accessed, and the time length of the current periodic TAU timer of UE.

The UE is required to be capable of recording the expiration information of the TAU periodic timer if the UE cannot reside in the GSM/UMTS network after the TAU periodic timer expires, for example, in the event that the UE resides in a place without network coverage.

Embodiment 2

Figure 5:
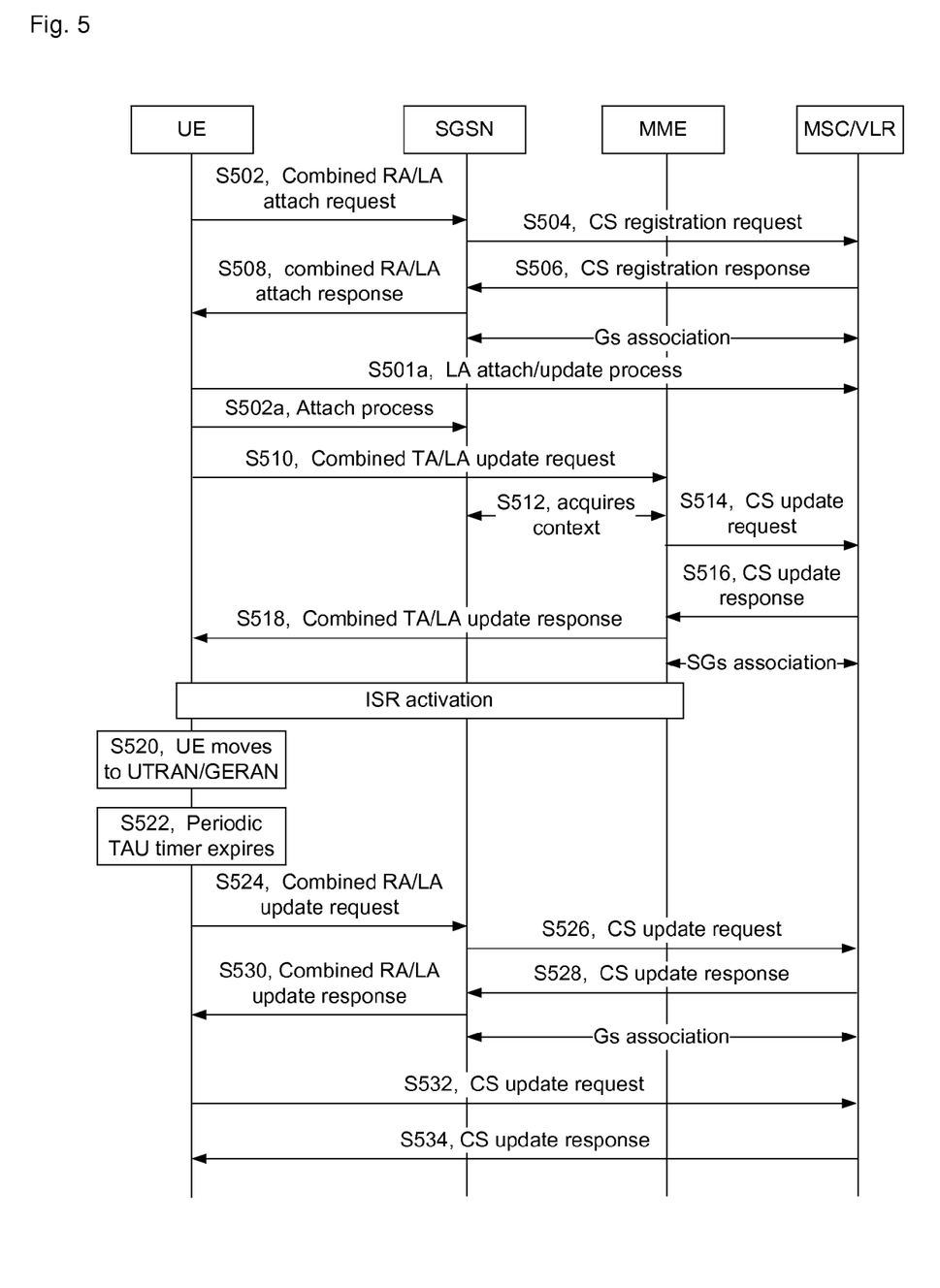
FIG. 5 shows an interaction flow chart of the method for guaranteeing user accessibility according to Embodiment 2 of the disclosure.

FIG. 5 shows the interaction flow chart of the method for guaranteeing UE accessibility according to Embodiment 2 of the disclosure, as shown in FIG. 5, comprising steps from S502 to S536 as follows:

S502: The UE initiates a combined routing area/location area attach message through the GERAN/UTRAN firstly, the message includes user identification, the GERAN/UTRAN bringing the current user location information to the SGSN.

S504: SGSN finds a corresponding MSC/VLR according to the current location information and initiates a CS registration to the MSC/VLR.

S506: The MSC/VLR returns to the SGSN, after the registration is completed, a SGSN CS registration response including registered location information LAI and a Temporary Mobile Subscriber Identity (TMSI) distributed to the UE by the MSC/VLR.

S508: The SGSN returns to the UE a combined attach response message including registered location information LAI and TMSI in the MSC/VLR and registered location information RAI and Packet TMSI (P-TMSI) in the SGSN.

When the GSM/UMTS network works in mode I, through S502 to S508, the UE implements the combined registration in the SGSN and the MSC/VLR, and establishes a Gs association between the SGSN and the MSC/VLR with the Gs interface being activated.

If the GSM/UMTS network works in mode II/III, the UE and network perform attach/update according to the flow shown in Steps S501a and S502a so as to implement a CS registration process in the MSC/VLR and a PS registration process in the SGSN.

S501a: The UE directly initiates, with a message including the subscriber identity, a LAU process to the MSC/VLR through the GERAN/UTRAN; the MSC/VLR, after implementing the CS registration processing flow, returns to the UE a location update response message including registered location information LAI of the UE in the MSC and TMSI distributed to the UE by the MSC/VLR.

S502a: The UE initiates, with a message including the subscriber identity, an attach/update process to the SGSN through the GERAN/UTRAN, the SGSN, after implementing the PS registration processing flow, returns to the UE a PS attach/update response message including registered location information RAI of the UE in the SGSN and a temporary subscriber identity P-TMSI.

When the GSM/UMTS network works in the mode II/III, the UE respectively implements registration in MSC/VLR and SGSN through the processes shown in Step S501a and Step S502a.

S510: After moves to the E-UTRAN, the UE initiates, with a message including the subscriber identity P-TMSI and RAI, a combined tracking area (TA)/LA update process.

S512: The MME finds the originally registered SGSN according to the P-TMSI and RAI and acquires UE context from the SGSN. In this step, an ISR may be established between the SGSN and the MME.

S514: The MME finds the corresponding MSC/VLR according to the Globally Unique Temporary UE Identity (GUTI) and the current location information included in the tracking area update message, and initiates a CS update process to the MSC/VLR.

S516: After registration, the MSC/VLR returns an MME CS update response, including location information LAI and the temporary UE identify TMSI distributed by the MSC/VLR, to the MME.

S518: After update, the MME returns to the UE a combined TA/LA update response including location information LAI and TMSI registered in the MSC/VLR, and location information TAI list and temporary UE identification GUTI registered in the MME, and flag of ISR as activated.

Through steps from S510 to S518, the UE implements registration in the MME, a SGs association is established between the MSC/VLR and the MME, and the ISR function is activated.

S520: UE accesses from the GSM/UMTS network again due to movement of the user, and because the ISR has been activated and the current routing area has been registered, the RAU process will not be initiated.

S522: Because currently the E-UTRAN periodic TAU timer in the UE still runs, the timer will expire after a period of time.

Herein, it should be noted that the subsequent flow steps vary due to the difference in network operating modes of the areas of the GSM/UMTS network in which the user resides. For network operating mode I, after the periodic TAU timer expires in the S522, the operations from S524 to S530 are to be executed; for network operating mode II/III, after the periodic TAU timer expires in the S522, operations from S532 to S534 are to be started to execute, which will be described below respectively.

First, subsequent flows for network operating mode I comprise:

S524: At this point, because the UE is residing in the GSM/UMTS network, the UE cannot initiate the periodic TAU. According to the disclosure, if the network operating mode of the area of the GSM/UMTS network in which the user resides is mode I, the UE will initiate, with a message including UE identity GUTI and TAI, a combined routing area/location area update process.

S526: The SGSN initiates a CS update request to the MSC/VLR.

S528: After registration, the MSC/VLR returns to the SGSN a CS update response including location information LAI and the temporary UE identify TMSI distributed by the MSC/VLR.

S530: After update, the SGSN returns to the UE a combined update response including location information LAI and TMSI registered in the MSC/VLR, as well as location information RAI and the temporary UE identify P-TMSI registered in the SGSN.

Through above steps, the UE completes registration in SGSN and Gs association is re-established between the MSC/VLR and the SGSN. The MSC/VLR may check user accessibility dependent on the SGSN and switch off the implicit detach timer in the SGSN, thereby solving the problem of user accessibility under the network mode I in the prior art and guaranteeing user accessibility.

Second, subsequent flows for network operating mode II/III comprise:

S532: If the network operating mode of the area of the GSM/UMTS network in which the user resides is mode II/III, the UE initiates a CS location update request to the MSC/VLR through circuit domain.

S534: After registration, the MSC/VLR returns to the UE a CS location update response including the temporary subscriber identity and the location area identity of the user.

It should be noted that the UE restarts the periodic LAU timer; for the subsequent periodic LAU timer, the UE will initiate a LAU process to the MSC/VLR. Through above steps, the problem of user accessibility in the case that working under the network mode II/III in the prior art is solved and user accessibility is guaranteed.

It should be noted that steps shown in the flow charts in the drawings could be executed in a computer system comprising such as a set of computer executable instructions, and, although the logic sequence is shown in the flow charts, in some cases, the shown or described steps may be executed according to a sequence different from that sequence.

Apparatus Embodiment

Figure 6:
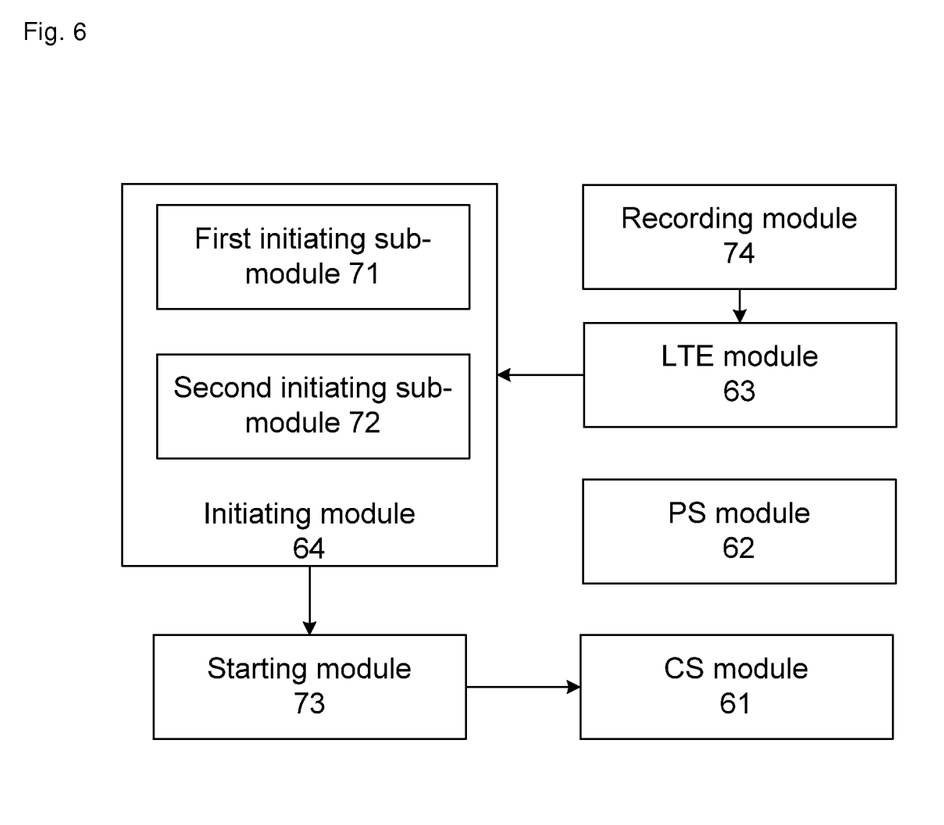
FIG. 6 shows a block diagram of a preferable structure of a multi-mode terminal according to the embodiments of the disclosure.

According to the embodiments of the disclosure, a multi-mode terminal is provided. The multi-mode terminal comprises: a CS module 61 of GSM/UMTS, a PS module 62 of GSM/UMTS, and a LTE module 63, wherein the CS module 61, the PS module 62 and the LTE module 63 respectively have a periodic update timer. According to embodiments of the disclosure, the multi-mode terminal further comprises: an initiating module 64 connected to the LTE module 63, which is configured to, initiate an update process to the MSC/VLR in the case that the periodic update timer in the LTE module 63 expires and the multi-mode terminal resides in the GSM/UMTS network.

FIG. 6 shows a block diagram of a preferable structure of a multi-mode terminal according to the embodiments of the disclosure, as shown in FIG. 6, the initiating module 64 comprises: a first initiating sub-module 71 and a second initiating sub-module 72. The multi-mode terminal further comprises: a starting module 73 and a recording module 74. The above structure will be described below.

Wherein, the first initiating sub-module 71 is configured to initiate a combined routing area/location area update to re-establish the Gs interface when the GSM/UMTS network where the multi-mode terminal resides works in the case of supporting network operating mode I, then the MSC/VLR may still, dependent on the SGSN, guarantee and check user accessibility; the second initiating sub-module 72 is configured to initiate a LAU when the GSM/UMTS where the multi-mode terminal resides works in the case of supporting network operating mode II/III; then, the MSC/VLR restarts an implicit detach timer and the UE restarts a LAU periodic timer, so as to guarantee UE accessibility.

The starting module 73 which is connected to the second initiating sub-module 72 and the CS module 61, which is configured to restart the periodic update timer in the CS module 61 in the case that the second initiating sub-module 72 initiates a LAU. The recording module 74 which is connected to the LTE module 63, which is configured to record expiration information of the periodic update timer of the LTE module 63 after the TAU periodic timer of the UE expires.

In conclusion, through the embodiments of the disclosure, the UE initiates an update process to the MSC/VLR after the TAU periodic timer of the UE expires in the case that ISR is activated and the UE resides in the GSM/UMTS, thereby solving the problem that the MSC/VLR believes the user inaccessible as it cannot receive any location update message, when the SGs interface is activated, ISR is activated, the terminal resides in the GSM/UMTS network, and the implicit timer in the MME expires, which thereby guarantees user accessibility.

Obviously, those skilled in the field should understand that the above modules or steps of the disclosure could be implemented through general computing devices; they may be integrated in a single computing device or distributed in a network formed by multiple computing devices, optionally, they can be achieved by program codes that can be executed by computing devices, thus, they can be stored in storage devices to be executed by computing devices. Under certain circumstances, the shown or described steps may be executed according to an order different from the above order, or they may be implemented by being manufactured into many integrated circuit modules, respectively, or by manufacturing multiple modules or steps among them into a single integrated circuit module. In this way, the disclosure is not limited to combinations of any specific hardware and software.

What are described above are only preferred embodiments of the disclosure, which are not intended to limit the disclosure. For those skilled in the art, the disclosure may have various alternations and changes. Any modifications, equivalent replacements and improvements within the spirit and principle of the disclosure should be contained within the protection scope of the disclosure.

The invention claimed is:

1. A method for realizing user accessibility, comprising:
   performing an activation of an idle mode signaling reduction (ISR) mode at a multi-mode user equipment (UE) in response to the UE being simultaneously registered with both a global system for mobile communications (GSM)/universal mobile telecommunication system (UMTS) network and a long term evolution (LTE) network; and
   after the UE moves to the coverage of the GSM/UMTS, while the ISR is active, in response to detecting an expiration of a LTE tracking area update (TAU) periodic timer of the UE, initiating a combined Routing Area/Location Area Update, or initiating an Location Area Update process by the UE to a mobile switching center (MSC)/visitor location register (VLR), the update process is varied depending on a network operating mode of the GSM/UMTS network, and is configured to event the MSC/VLR to identify the UE as being implicit detach.

2. The method according to claim 1, wherein the Initiating, by a UE, an update process to the MSC/VLR comprises:
   the UE initiates a combined routing area/location area update to reactivate a Gs interface if the GSM/UMTS network where the UE resides supports network operating mode I.

3. The method according to claim 2, wherein the UE initiates combined routing area/location area update, comprises:
   the UE initiates location update to the MSC/VLR through a serving GPRS support node (SGSN) to establish a Gs association.

4. The method according to claim 1, wherein the UE initiates update to the MSC/VLR comprises:
   the UE initiates periodic location area update (LAU) to the MSC/VLR if the GSM/UMTS network where the UE resides works in the case of supporting network operating mode II/III.

5. The method according to claim 4, wherein, after the UE initiates LAU to the MSC/VLR, the method further comprises:
   restarting a LAU periodic timer by the UE.

6. The method according to claim 5, wherein the UE sets the time length of the periodic LAU timer according to one of the following ways:
   setting according to the time length of the periodic LAU update timer broadcasted by the radio system in the GSM/UMTS network area to which the UE currently accessed;
   setting according to the time length of the current periodic TAU timer of the UE;
   setting according to the smaller one of the following two time lengths: the time length of the periodic LAU update timer broadcasted by the radio system in the GSM/UMTS network area to which the UE currently accessed, and the time length of the current periodic TAU timer of the UE.

7. The method according to claim 4, wherein, after the UE initiates LAU to the MSC/VLR, the method further comprises:
   restarting an implicit detach timer by the MSC/VLR.

8. The method according to claim 1, wherein, after the TAU periodic timer of the UE expires, the method further comprises:
   recording expiration information of the TAU periodic timer by the UE.

9. A multi-mode user terminal (UE), comprising a circuit switching (CS) module configured to operate in a GSM/UMTS, a packet switching (PS) module configured to operate in the GSM/UMTS and a long-term evolution (LTE) module, wherein the CS module, the PS module and the LTE module respectively have a separate periodic update timer;
   the UE is configured to perform an activation of an idle mode signaling reduction (ISR) mode at the UE, in response to the UE being simultaneously registered with both a global system for mobile communications (GSM)/universal mobile telecommunication system (UMTS) network and a long term evolution (LTE) network, wherein the UE further comprises:
   an initiating module, which is configured to initiate a combined Routing Area/Location Area Update or to initiate an Location Area Update process to a MSC/VLR, after the UE moves to the coverage of the GSM/UMTS, while the ISR is active, in response to an expiration of the periodic update timer in the LTE module, wherein the update process is varied depending on a network operating mode of the GSM/UMTS network, and is configured to prevent the MSC/VLR to identify the UE as being implicit detach;
   wherein the CS module, the PS module, the LTE module, and the initiating module comprise a plurality of integrated circuit modules.

10. The multi-mode terminal according to claim 9, wherein the initiating module comprises:
    a first initiating sub-module, which is configured to initiate a combined routing area/location area update when the GSM/UMTS where the multi-mode terminal resides works in the case of supporting network operating mode I;
    a second initiating sub-module, which is configured to initiate a LAU when the GSM/UMTS where the multi-mode terminal resides works in the case of supporting network operating mode II/III.

11. The multi-mode terminal according to claim 10, wherein the multi-mode terminal further comprises:
    a starting module, which is configured to restart the periodic update timer in the CS module in the case that the second initiating sub-module initiates a LAU,
    wherein the starting module comprises a integrated circuit module.

12. The multi-mode terminal according to claim 9, wherein the multi-mode terminal further comprises:
    a recording module, which is configured to record expiration information of the periodic update timer in the LTE module after the TAU periodic timer of the UE expires,
    wherein the recording module comprises a integrated circuit module.

13. The method according to claim 5, wherein, after the UE initiates LAU to the MSC/VLR, the method further comprises:
    restarting an implicit detach timer by the MSC/VLR.

14. The method according to claim 6, wherein, after the UE initiates LAU to the MSC/VLR, the method further comprises:
    restarting an implicit detach timer by the MSC/VLR.

* * * * *